US012057263B2

(12) United States Patent
Wang et al.

(10) Patent No.: US 12,057,263 B2
(45) Date of Patent: Aug. 6, 2024

(54) LOW-COST RARE EARTH MAGNET AND CORRESPONDING MANUFACTURING METHOD THEREOF

(71) Applicant: Yantai Dongxing Magnetic Materials Inc., Shandong (CN)

(72) Inventors: Chuanshen Wang, Shandong (CN); Kunkun Yang, Shandong (CN); Zhongjie Peng, Shandong (CN); Kaihong Ding, Shandong (CN)

(73) Assignee: Yantai Dongxing Magnetic Materials Inc., Yantai (CN)

( * ) Notice: Subject to any disclaimer, the term of this patent is extended or adjusted under 35 U.S.C. 154(b) by 0 days.

(21) Appl. No.: 17/951,137

(22) Filed: Sep. 23, 2022

(65) Prior Publication Data

US 2023/0102274 A1 Mar. 30, 2023

(30) Foreign Application Priority Data

Sep. 24, 2021 (CN) .......................... 202111121731.8

(51) Int. Cl.

| | |
|---|---|
| ***H01F 41/02*** | (2006.01) |
| ***B22F 3/16*** | (2006.01) |
| ***B22F 3/26*** | (2006.01) |
| ***B22F 9/04*** | (2006.01) |
| ***C22C 38/00*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |
| ***H01F 1/057*** | (2006.01) |
| *B22F 3/24* | (2006.01) |

(52) U.S. Cl.

CPC ............ *H01F 41/0293* (2013.01); *B22F 3/16* (2013.01); *B22F 3/26* (2013.01); *B22F 9/04* (2013.01); *C22C 38/002* (2013.01); *C22C 38/005* (2013.01); *C22C 38/06* (2013.01); *C22C 38/10* (2013.01); *C22C 38/14* (2013.01); *C22C 38/16* (2013.01); *H01F 1/0577* (2013.01); *H01F 41/0266* (2013.01); *B22F 2003/248* (2013.01); *B22F 2009/044* (2013.01); *B22F 2202/05* (2013.01); *B22F 2301/355* (2013.01); *C22C 2202/02* (2013.01)

(58) Field of Classification Search

None

See application file for complete search history.

(56) References Cited

U.S. PATENT DOCUMENTS

2021/0233689 A1 7/2021 Li et al.
2022/0059262 A1 2/2022 Liu et al.

FOREIGN PATENT DOCUMENTS

| | | | | |
|---|---|---|---|---|
| CN | 108417380 A | | 8/2018 | |
| CN | 108335897 B | | 2/2020 | |
| CN | 108922768 B | * | 10/2020 | ......... H01F 41/0253 |
| CN | 108922768 B | | 10/2020 | |
| CN | 111916285 A | | 11/2020 | |
| JP | 2011060975 A | | 3/2011 | |
| JP | 2018104818 A | | 7/2018 | |
| JP | 2018182299 A | | 11/2018 | |
| JP | 2021533557 A | | 12/2021 | |
| JP | 2022031605 A | | 2/2022 | |
| JP | 2022516380 A | | 2/2022 | |
| JP | 2023045934 A | | 4/2023 | |

OTHER PUBLICATIONS

The search report of family EP application No. 22197058 issued on Feb. 3, 2023.
The search report of family JP application No. 2022-139853 issued on Jul. 13, 2023.

* cited by examiner

*Primary Examiner* — Anthony M Liang
(74) *Attorney, Agent, or Firm* — Samson G. Yu

(57) ABSTRACT

The disclosure relates to the technical field of sintered type NdFeB permanent magnets, in particular to a low-cost rare earth magnet and manufacturing method. There is provided a method of preparing a high-coercivity sintered NdFeB magnet including cerium comprising the following steps: (S1) providing alloy flakes composed of $R_xT_{(1-x-y-z)}B_yM_z$; (S2) mixing the alloy flakes, a low melting point powder, and a lubricant, then subjecting the mixture to a hydrogen embrittlement process followed in this order by pulverizing the process product to an alloy powder by jet milling, magnetic field orientation molding of the allow powder to obtain a blank, sintering and aging treatment the blank; (S3) coating a film composed of a diffusion source of formula $R1_xR2_yH_zM_{1-x-y-z}$ on the sintered NdFeB magnet; and (S4) performing a diffusion heat treatment, followed by aging the sintered NdFeB magnet to obtain the low-cost rare earth magnet.

19 Claims, No Drawings

LOW-COST RARE EARTH MAGNET AND CORRESPONDING MANUFACTURING METHOD THEREOF

CROSS-REFERENCETO RELATED APPLICATIONS

This application is based on Chinese Patent Application No. 202111121731.8,filed Sep. 24, 2021,which claims the benefit of priority to the Chinese Patent Application, which is incorporated by reference in its entirety herein.

TECHNICAL FIELD

The disclosure relates to the technical field of sintered type NdFeB permanent magnets, in particular to a low-cost rare earth magnet and a corresponding manufacturing method thereof.

BACKGROUND

NdFeB sintered permanent magnets are widely used in high-tech fields such as electronic equipment, medical equipment, electric vehicles, household products, robots, etc. In the past few decades of development, NdFeB permanent magnets have been rapidly developed, and have become an indispensable functional component in industrial applications.

Heavy rare earths terbium (Tb) or Dysprosium (Dy) are added for greatly improving the magnetic coercivity of the NdFeB magnets. According to one conventional manufacturing process, Tb or Dy are directly mixed into the magnet alloy powders, but consume large amounts of Tb or Dy thereby significantly increasing the material costs. According to an improved manufacturing process, the amount of Tb or Dy can be greatly reduced by applying the grain boundary diffusion technology, but still the material costs are very high for the heavy rare earths. Therefore, it is still important to continuously reduce the total content of heavy rare earths in the NdFeB magnet.

Furthermore, the world market price for high abundance cerium (Ce) is much cheaper than the for neodymium (Nd), praseodymium (Pr) or alloys thereof, Increasing the proportion of Ce in the magnet alloy may therefore significantly reduce the cost of NdFeB magnets. But replacing the elements Nd or Pr by Ce may reduce the performance of the NdFeB magnet.

One way to introduce Ce into the magnet is to diffuse and age a special Ce-containing diffusion source. However, the high temperature resistance of Ce-containing magnets is poor due to its special grain boundary structure.

CN108417380A discloses Ce-containing magnets being formed by diffusion coating of Ce), $(LRE_aHRE_{1-a})_yM_{100-x-y}$, wherein 0<x≤20 and 15≤y≤99.9, and 15<x+y≤99.9 and 0≤a≤1.0; LRE is one or more of La, Pr, Nd and Y; HRE is one or more of Tb, Dy and Ho; and M is one or more of Al, Cu, Zn, Ga, Ag, Pb, Bi and Sn.

CN111640549A discloses that cobalt-containing amorphous grain boundaries could improve the magnetic performance. However, there are no low melting point diffusion sources and due to the poor high-temperature resistance the magnetic performance of the NdFeB magnet may be reduced.

SUMMARY

The disclosure is defined by the appended claims. The description that follows is subjected to this limitation. Any disclosure lying outside the scope of said claims is only intended for illustrative as well as comparative purposes.

According to the present disclosure, there is provided a method of preparing a high-coercivity sintered NdFeB magnet including cerium as defined in claim 1. The method comprises the following steps:

(S1) Providing alloy flakes composed of $R_xT_{(1-x-y-x)}B_yM_z$ wherein

R is at least one of Nd, Pr, Ho, and Gd;

T is at least one of Fe and Co; and

M is at least one of Mg, Ti, Zr, Nb, and Mo; and x, y, and z are 28.0wt %≤x≤33.0wt %, 0.8wt %≤y≤1.2wt %, and 0wt %≤z≤3.0wt %;

(S2) mixing the alloy flakes, a low melting point powder, and a lubricant, then subjecting the mixture to a hydrogen embrittlement process followed in this order by pulverizing the process product to an alloy powder by jet milling, magnetic field orientation molding of the alloy powder to obtain a blank, sintering and aging treatment the blank, and cutting the obtained sintered NdFeB magnet into the desired shape, wherein the low melting point powder is at least one of $Ce_\alpha Al_{100-\alpha}$ with 90≤α≤99, $Ce_\beta Cu_{1-\beta}$ with 80≤β≤99 and $Ce_\gamma Ga_{1-\beta}$with 80≤γ≤99 and wherein a content of the Ce in the mixture is in the range of 1 to 10 wt % based on a total weight of the alloy flakes and the low melting point powder;

(S3) coating a film composed of a diffusion source of formula $R1_xR2_yH_zM_{1-x-y-z}$ on the sintered NdFeB magnet, wherein R1 is at least one element of Nd and Pr;

R2 is at least one element of Ho and Gd;

H is at least one element of Tb and Dy;

M is at least two elements of Al, Cu, Ga, Ti, Co, Mg, Zn, and Sn; and x, y, and z are 5.0wt % <x<50.0wt %, 0wt % <y≤15.0wt %, and 30.0wt % ≤z≤90.0wt %; and (S4) Performing a diffusion heat treatment so as to diffuse the diffusion source into the sintered NdFeB magnet, followed by aging the sintered NdFeB magnet to obtain the low-cost rare earth magnet.

Another aspect of the present disclosure refers to a high-coercivity sintered NdFeB magnet including cerium obtained by the above-mentioned preparation method.

Further embodiments of the present disclosure could be learned from the dependent claims and the following description.

DETAILED DESCRIPTION

Reference will now be made in detail to embodiments. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

General Concept

There is provided a method of preparing a high-coercivity sintered NdFeB magnet including cerium comprising the following steps:

(S1) Providing alloy flakes composed of $R_xT_{(1-x-y-z)}B_yM_z$ wherein

R is at least one of Nd, Pr, Ho, and Gd;

T is at least one of Fe and Co; and

M is at least one of Al, Mg, Ti, Zr, Nb, and Mo; and x, y, and z are 28.0wt % ≤x≤33.0wt %, 0.8wt % ≤y≤1.2wt %, and 0wt % ≤z≤3.0wt %, in particular 0.1wt % ≤x≤1.0wt %;

(S2) Mixing the alloy flakes, a low melting point powder, and a lubricant, then subjecting the mixture to a hydrogen embrittlement process followed in this order by pulverizing the process product to an alloy powder by jet milling, magnetic field orientation molding of the alloy powder to obtain a blank, sintering and aging treatment the blank, and cutting the obtained sintered NdFeB magnet into the desired shape, wherein the low melting point powder is at least one of $Ce_{\alpha}Al_{100-\alpha}$ with 90≤α≤99, $Ce_{\beta}Cu_{1-\beta}$ with 80≤β≤99, and $Ce_{\gamma}Ga_{1-\gamma}$ with 80≤γ≤99 and wherein a content of the Ce in the mixture is in the range of 1 to 10 wt %, in particular 2 to 8 wt %, based on a total weight of the alloy flakes and the low melting point powder;

(S3) Coating a film composed of a diffusion source of formula $R1_xR2_yH_zM_{1-x-y-z}$ on the sintered NdFeB magnet, wherein R1 is at least one element of Nd and Pr;

R2 is at least one element of Ho and Gd;

H is at least one element of Tb and Dy;

M is at least two elements of Al, Cu, Ga, Ti, Co, Mg, Zn, and Sn; and x, y, and z are 5.0wt % <x <50.0wt %, in particular 10.0wt % x≤45.0wt %, 0wt % <y≤15.0wt %, in particular 5wt % ≤y≤10.0wt %, and 30.0wt % -≤z≤90.0wt %, in particular 40.0wt % ≤z≤70.0wt %; and (S4) Performing a diffusion heat treatment so as to diffuse the diffusion source into the sintered NdFeB magnet, followed by aging the sintered NdFeB magnet to obtain the low-cost rare earth magnet.

According to an embodiment, the hydrogen embrittlement process in step S2 comprises a hydrogen absorption step and a dehydrogenation step, the hydrogen absorption step is performed at a temperature in the range of 100 to 300° C. and the dehydrogenation step is performed at a temperature in the range of 400 to 600° C. During the hydrogen absorption step, the content of hydrogen content may be less than 1000 ppm, and the content of oxygen may be less than 500 ppm.

According to another embodiment, in step S2, an average particle size D50 of the low melting point powders is 200 nm-4 μm and an average particle size D50 of the NdFeB powder after jet milling is 3-5 μm. The average particle diameter D50 of the particles may be measured by laser diffraction (LD). The method may be performed according to ISO 13320-1. According to the IUPAC definition, the equivalent diameter of a non-spherical particle is equal to a diameter of a spherical particle that exhibits identical properties to that of the investigated non-spherical particle.

According to another embodiment, in step S2, a sintering temperature of NdFeB magnets is 980-1060° C. and a sintering time is 6-15 h. Further, the aging may include a primary aging step at 850° C. for 3 h and a secondary aging step at 450-660° C. for 3 h.

According to the preparation method, the NdFeB magnet is machined into corresponding size and is coated with diffusion source, then diffused and aged.

The diffusion source may be produced by atomized milling or ingot casting.

According to another embodiment, in step S4, a diffusion temperature is 850-930° C. for a diffusion time of 6-30 h and an aging temperature is 420-680° C. for an aging time of 3-10 h. A heating rate to the aging temperature may be 1-5° C./min and a cooling rate may be 5-20° C./min.

A high-coercivity sintered NdFeB magnet will be obtained by the process.

The diffusion source is a low-heavy rare earth alloy diffusion source, which contains elements Ho and Gd that can increase the high temperature resistance of the magnet. That is, the diffusion source can greatly improve the coercive force of the magnet and make the magnet have high temperature resistance. In addition, the coercivity of the magnet is greatly increased with less heavy rare earth. The coercivity increase after diffusion of a Dy alloy can reach 636.8-835.8kA/m, which is comparable to the diffusion effect of pure Tb metal. The magnet has high temperature resistance and the production costs of the magnet may be greatly reduced. The heavy rare earths shell of Dy or Tb and Ho or Gd has a deep extension and the grain boundary structures all have good high temperature resistance.

The combination of diffusion source and magnet composition including Ce can greatly increase the diffusion depth of heavy rare earths, and form a double-shell or even three-shell structure of heavy rare earth Dy or Tb and Ho or Gd. The formation of deep diffusion heavy rare earths Dy or Tb and Ho or Gd double-shell or even tri-shell structures and grain boundary structures can be well tolerated at high temperatures.

The present disclosure allows improve the high temperature resistance and, at the same time, reduce the content of heavy rare earths in the magnet. The process is simple and enables mass production. In summary, the process allows to greatly reduce the costs for high-coercivity sintered NdFeB magnets.

EXAMPLES

In the following, compositions, preparation conditions and magnetic characteristics of Examples 1-28 and Comparative Example 1-7 are described in detail.

The general preparation process is as follows:

(1) NdFeB alloy raw materials are smelted in a strip casting process to obtain NdFeB alloy sheets and the NdFeB alloy sheets are mechanically crushed into NdFeB alloy flakes of about 150-400 μm particle size.

(2) Low melting point powders of CeAl, CeCu and CeGa with a particle size in the range of 200 nm-4 μm were added to the NdFeB alloy flakes and mixed therewith. The low melting point alloy powders are coated on the NdFeB alloy flakes. NdFeB alloy flakes can be evenly mixed in a mixer with the low melting point powders. Preferably, lubricants may be added.

CeAl means $Ce_{\alpha}Al_{100-\alpha}$ with 90≤α≤99, CeCu means $Ce_{\beta}Cu_{1-\beta}$ with 80≤β≤99, and CeGa means $Ce_{\gamma}Ga_{1-\gamma}$ with 80≤γ≤99.

(3) The mixed materials are put into the hydrogen treatment furnace for hydrogen absorption and dehydrogenation treatment, wherein hydrogen absorption is performed at 100-300° C. and the dehydrogenation temperature is 400-600° C. Starting from the product of the hydrogen embrittlement process, NdFeB powders are prepared by jet milling. The NdFeB powders have an average particle size in the range of 3-5 μm. The composition of the obtained NdFeB powders are summarized in Table 1.

(4) After air flow grinding the NdFeB alloy powder magnetic field orientation moldingand pressing into the blank by isostatic pressure is performed.

(5) The obtained blank is sintered in vacuum, and quickly cooled down by argon. Then the sintered blank is treated under primary aging and secondary aging conditions. Furthermore, the magnet performance of the obtained sintered NdFeB magnet is tested. The specific process conditions and magnet characteristics are shown in Table 2.

(6) The sintered NdFeB magnet is mechanically processed to make the desired shape, and then a diffusion source film is coated on both sides of the sample perpendicular to the C axis. The amount of the diffusion source film being coated on the sintered NdFeB magnet is set to be such that the weight percentage of Dy is 1.0% based on a total weight of the sintered NdFeB magnet and the diffusion source film. The specific process conditions of the diffusion process the diffusion sources and magnet characteristics of the obtained high-coercivity sintered NdFeB magnets are summarized in Table 3. The composition values of the diffusion source compounds refer to percentages by weight (for example, $Pr_{20}Ho_5Dy_{55}Cu_{15}Mg_5$=20wt % Pr, 5wt % Ho, 55wt % Dy, 15wt % Cu, and 5wt % Mg).

TABLE 1

| Composition of NdFeB alloy flakes and low melting point powders<br>Composition of NdFeB alloy powder after jet milling wt % | | | | | | | | | | | | |
|---|---|---|---|---|---|---|---|---|---|---|---|---|
| Number | Al | B | Co | Cu | Fe | Ga | Nd | Pr | Ti | Ce | Gd | TRE |
| Comparative Example 1 | 0.30% | 0.97% | 1.00% | 0.15% | Margin | 0.05% | 29.02% | | | | 0.5% | 29.52% |
| Example 1 | 0.30% | 0.97% | 1.00% | 0.15% | Margin | 0.05% | 27.02% | | | 2.00% | 0.5% | 29.52% |
| Example 2 | 0.30% | 0.97% | 1.00% | 0.15% | Margin | 0.05% | 25.02% | | | 4.00% | 0.5% | 29.52% |
| Example 3 | 0.30% | 0.97% | 1.00% | 0.15% | Margin | 0.05% | 23.02% | | | 6.00% | 0.5% | 29.52% |
| Example 4 | 0.30% | 0.97% | 1.00% | 0.15% | Margin | 0.05% | 21.02% | | | 8.00% | 0.5% | 29.52% |
| Comparative Example 2 | 0.41% | 0.92% | 1.00% | 0.29% | Margin | 0.10% | 26.35% | 6.59% | 0.05% | | | 32.94% |
| Example 5 | 0.41% | 0.92% | 1.00% | 0.29% | Margin | 0.10% | 24.75% | 6.19% | 0.05% | 2.00% | | 32.94% |
| Example 6 | 0.41% | 0.92% | 1.00% | 0.29% | Margin | 0.10% | 23.15% | 5.79% | 0.05% | 4.00% | | 32.94% |
| Example 7 | 0.41% | 0.92% | 1.00% | 0.29% | Margin | 0.10% | 21.55% | 5.39% | 0.05% | 6.00% | | 32.94% |
| Example 8 | 0.41% | 0.92% | 1.00% | 0.29% | Margin | 0.10% | 19.95% | 4.99% | 0.05% | 8.00% | | 32.94% |
| Comparative Example 3 | 0.53% | 0.95% | 1.00% | 0.44% | Margin | 0.11% | 24.74% | 6.19% | 0.06% | | | 30.93% |
| Example 9 | 0.53% | 0.95% | 1.00% | 0.44% | Margin | 0.11% | 23.14% | 5.78% | 0.06% | 2.00% | | 30.93% |
| Example 10 | 0.53% | 0.95% | 1.00% | 0.44% | Margin | 0.11% | 21.54% | 5.39% | 0.06% | 4.00% | | 30.93% |
| Example 11 | 0.53% | 0.95% | 1.00% | 0.44% | Margin | 0.11% | 19.94% | 4.99% | 0.06% | 6.00% | | 30.93% |
| Example 12 | 0.53% | 0.95% | 1.00% | 0.44% | Margin | 0.11% | 18.34% | 4.59% | 0.06% | 8.00% | | 30.93% |
| Comparative Example 4 | 0.82% | 0.94% | 1.00% | 0.29% | Margin | 0.11% | 23.86% | 7.95% | 0.10% | | | 31.81% |
| Example 13 | 0.82% | 0.94% | 1.00% | 0.29% | Margin | 0.11% | 22.36% | 7.45% | 0.10% | 2.00% | | 31.81% |
| Example 14 | 0.82% | 0.94% | 1.00% | 0.29% | Margin | 0.11% | 20.86% | 6.95% | 0.10% | 4.00% | | 31.81% |
| Example 15 | 0.82% | 0.94% | 1.00% | 0.29% | Margin | 0.11% | 19.36% | 6.45% | 0.10% | 6.00% | | 31.81% |
| Example 16 | 0.82% | 0.94% | 1.00% | 0.29% | Margin | 0.11% | 17.86% | 5.95% | 0.10% | 8.00% | | 31.81% |
| Comparative Example 5 | 0.53% | 0.94% | 1.00% | 0.29% | Margin | 0.32% | 23.71% | 7.90% | 0.20% | | | 31.61% |
| Example 17 | 0.53% | 0.94% | 1.00% | 0.29% | Margin | 0.32% | 22.21% | 7.40% | | 2.00% | | 31.61% |
| Example 18 | 0.53% | 0.94% | 1.00% | 0.29% | Margin | 0.32% | 20.71% | 6.90% | | 4.00% | | 31.61% |
| Example 19 | 0.53% | 0.94% | 1.00% | 0.29% | Margin | 0.32% | 19.21% | 6.40% | | 6.00% | | 31.61% |
| Example 20 | 0.53% | 0.94% | 1.00% | 0.29% | Margin | 0.32% | 17.71% | 5.90% | | 8.00% | | 31.61% |
| Comparative Example 6 | 0.53% | 0.94% | 1.00% | 0.44% | Margin | 0.21% | 31.02% | | 0.20% | | 0.5% | 31.52% |
| Example 21 | 0.53% | 0.94% | 1.00% | 0.44% | Margin | 0.21% | 29.02% | | 0.20% | 2.00% | 0.5% | 31.52% |
| Example 22 | 0.53% | 0.94% | 1.00% | 0.44% | Margin | 0.21% | 27.02% | | 0.20% | 4.00% | 0.5% | 31.52% |
| Example 23 | 0.53% | 0.94% | 1.00% | 0.44% | Margin | 0.21% | 25.02% | | 0.20% | 6.00% | 0.5% | 31.52% |
| Example 24 | 0.53% | 0.94% | 1.00% | 0.44% | Margin | 0.21% | 23.02% | | 0.20% | 8.00% | 0.5% | 31.52% |
| Comparative Example 7 | 0.05% | 0.92% | 0.90% | 0.16% | Margin | 0.20% | 22.50% | 7.50% | 0.10% | | | 30.00% |
| Example 25 | 0.05% | 0.92% | 0.90% | 0.16% | Margin | 0.20% | 22.40% | 5.60% | 0.10% | 2.00% | | 30.00% |
| Example 26 | 0.05% | 0.92% | 0.90% | 0.16% | Margin | 0.20% | 20.80% | 5.20% | 0.10% | 4.00% | | 30.00% |
| Example 27 | 0.05% | 0.92% | 0.90% | 0.16% | Margin | 0.20% | 19.20% | 4.80% | 0.10% | 6.00% | | 30.00% |
| Example 28 | 0.05% | 0.92% | 0.90% | 0.16% | Margin | 0.20% | 17.60% | 4.40% | 0.10% | 8.00% | | 30.00% |

TABLE 2

| Preparation process conditions and magnet characteristics of the sintered NdFeB magnets | | | | | | | | | | | |
|---|---|---|---|---|---|---|---|---|---|---|---|
| Number | Sintering temp. ° C. | holding time h | Primary aging ° C. | holding time h | Secondary aging ° C. | holding time h | Heating rate ° C./min | Cooling rate ° C./min | Br T | Hcj kA/m | Hk/ Hcj |
| Comparative Example 1 | 980 | 15 | 850 | 3 | 450 | 3 | 5 | 5 | 1.46 | 1137.5 | 0.99 |
| Example 1 | 980 | 15 | 850 | 3 | 450 | 3 | 5 | 5 | 1.43 | 1002.2 | 0.98 |
| Example 2 | 980 | 15 | 850 | 3 | 450 | 3 | 5 | 5 | 1.43 | 875.6 | 0.98 |
| Example 3 | 980 | 15 | 850 | 3 | 450 | 3 | 5 | 5 | 1.42 | 732.3 | 0.98 |
| Example 4 | 980 | 15 | 850 | 3 | 450 | 3 | 5 | 5 | 1.36 | 700.5 | 0.98 |
| Comparative Example 2 | 980 | 15 | 850 | 3 | 480 | 3 | 3 | 15 | 1.37 | 1312.6 | 0.98 |
| Example 5 | 980 | 15 | 850 | 3 | 480 | 3 | 3 | 15 | 1.34 | 1162.2 | 0.98 |
| Example 6 | 980 | 15 | 850 | 3 | 480 | 3 | 3 | 15 | 1.34 | 1050.7 | 0.98 |

TABLE 2-continued

Preparation process conditions and magnet characteristics of the sintered NdFeB magnets

| Number | Sintering temp. ° C. | holding time h | Primary aging ° C. | holding time h | Secondary aging ° C. | holding time h | Heating rate ° C./min | Cooling rate ° C./min | Br T | Hcj kA/m | Hk/ Hcj |
|---|---|---|---|---|---|---|---|---|---|---|---|
| Example 7 | 980 | 15 | 850 | 3 | 480 | 3 | 3 | 15 | 1.34 | 907.4 | 0.98 |
| Example 8 | 980 | 15 | 850 | 3 | 480 | 3 | 3 | 15 | 1.27 | 875.6 | 0.98 |
| Comparative Example 3 | 1020 | 13 | 850 | 3 | 480 | 3 | 3 | 20 | 1.40 | 1285.5 | 0.97 |
| Example 9 | 1020 | 13 | 850 | 3 | 480 | 3 | 3 | 20 | 1.37 | 1142.3 | 0.98 |
| Example 10 | 1020 | 13 | 850 | 3 | 480 | 3 | 3 | 20 | 1.37 | 1026.8 | 0.98 |
| Example 11 | 1020 | 13 | 850 | 3 | 480 | 3 | 3 | 20 | 1.36 | 891.5 | 0.98 |
| Example 12 | 1020 | 13 | 850 | 3 | 480 | 3 | 3 | 20 | 1.30 | 851.7 | 0.98 |
| Comparative Example 4 | 1040 | 9 | 850 | 3 | 550 | 3 | 5 | 10 | 1.35 | 1504.4 | 0.98 |
| Example 13 | 1040 | 9 | 850 | 3 | 550 | 3 | 5 | 10 | 1.32 | 1369.1 | 0.98 |
| Example 14 | 1040 | 9 | 850 | 3 | 550 | 3 | 5 | 10 | 1.32 | 1241.8 | 0.98 |
| Example 15 | 1040 | 9 | 850 | 3 | 550 | 3 | 5 | 10 | 1.31 | 1114.4 | 0.98 |
| Example 16 | 1040 | 9 | 850 | 3 | 550 | 3 | 5 | 10 | 1.25 | 1074.6 | 0.98 |
| Comparative Example 5 | 1040 | 9 | 850 | 3 | 550 | 3 | 5 | 15 | 1.38 | 1394.6 | 0.98 |
| Example 17 | 1040 | 9 | 850 | 3 | 550 | 3 | 5 | 15 | 1.35 | 1249.7 | 0.98 |
| Example 18 | 1040 | 9 | 850 | 3 | 550 | 3 | 5 | 15 | 1.35 | 1146.2 | 0.98 |
| Example 19 | 1040 | 9 | 850 | 3 | 550 | 3 | 5 | 15 | 1.34 | 995.0 | 0.98 |
| Example 20 | 1040 | 9 | 850 | 3 | 550 | 3 | 5 | 15 | 1.29 | 955.2 | 0.98 |
| Comparative Example 6 | 1060 | 6 | 850 | 3 | 580 | 3 | 1 | 20 | 1.38 | 1347.6 | 0.97 |
| Example 21 | 1060 | 6 | 850 | 3 | 580 | 3 | 1 | 20 | 1.35 | 1209.9 | 0.98 |
| Example 22 | 1060 | 6 | 850 | 3 | 580 | 3 | 1 | 20 | 1.35 | 1098.5 | 0.98 |
| Example 23 | 1060 | 6 | 850 | 3 | 580 | 3 | 1 | 20 | 1.34 | 955.2 | 0.98 |
| Example 24 | 1060 | 6 | 850 | 3 | 580 | 3 | 1 | 20 | 1.28 | 915.4 | 0.98 |
| Comparative Example 7 | 1050 | 12 | 850 | 3 | 660 | 3 | 1 | 5 | 1.44 | 1212.3 | 0.99 |
| Example 25 | 1050 | 12 | 850 | 3 | 660 | 3 | 1 | 5 | 1.41 | 1077.0 | 0.98 |
| Example 26 | 1050 | 12 | 850 | 3 | 660 | 3 | 1 | 5 | 1.39 | 971.1 | 0.98 |
| Example 27 | 1050 | 12 | 850 | 3 | 660 | 3 | 1 | 5 | 1.38 | 983.1 | 0.98 |
| Example 28 | 1050 | 12 | 850 | 3 | 660 | 3 | 1 | 5 | 1.35 | 925.7 | 0.98 |

TABLE 3

Diffusion sources, process conditions and characteristics of the sintered NdFeB magnets after diffusion

| Number | Diffusion Source | Size (mm) mm | Diffusion Temp. ° C. | holding time h | Aging Temp. ° C. | holding time h | Heating rate ° C./min | Cooling rate ° C./min | Performance after Diffusion Br | Hcj | Hk/ Hcj | $\beta Hcj_{150° C.}$ |
|---|---|---|---|---|---|---|---|---|---|---|---|---|
| Comparative Example 1 | $Pr_{20}Ho_5Dy_{55}Cu_{15}Mg_5$ | 10*10*3 | 850 | 30 | 420 | 10 | 5 | 5 | 1.432 | 1950.2 | 0.97 | 0.520% |
| Example 1 | $Pr_{20}Ho_5Dy_{55}Cu_{15}Mg_5$ | 10*10*3 | 850 | 30 | 420 | 10 | 5 | 5 | 1.408 | 1926.3 | 0.96 | 0.521% |
| Example 2 | $Pr_{20}Ho_5Dy_{55}Cu_{15}Mg_5$ | 10*10*3 | 850 | 30 | 420 | 10 | 5 | 5 | 1.406 | 1767.1 | 0.97 | |
| Example 3 | $Pr_{20}Ho_5Dy_{55}Cu_{15}Mg_5$ | 10*10*3 | 850 | 30 | 420 | 10 | 5 | 5 | 1.401 | 1631.8 | 0.97 | |
| Example 4 | $Pr_{20}Ho_5Dy_{55}Cu_{15}Mg_5$ | 10*10*3 | 850 | 30 | 420 | 10 | 5 | 5 | 1.340 | 1592.0 | 0.97 | |
| Comparative Example 2 | $Nd_{20}Ho_{10}Dy_{50}Cu_5Co_{15}$ | 10*10*4 | 880 | 20 | 500 | 6 | 3 | 15 | 1.340 | 2117.4 | 0.96 | 0.490% |
| Example 5 | $Nd_{20}Ho_{10}Dy_{50}Cu_5Co_{15}$ | 10*10*4 | 880 | 20 | 500 | 6 | 3 | 15 | 1.315 | 2077.6 | 0.97 | 0.495% |
| Example 6 | $Nd_{20}Ho_{10}Dy_{50}Cu_5Co_{15}$ | 10*10*4 | 880 | 20 | 500 | 6 | 3 | 15 | 1.313 | 1934.3 | 0.97 | |
| Example 7 | $Nd_{20}Ho_{10}Dy_{50}Cu_5Co_{15}$ | 10*10*4 | 880 | 20 | 500 | 6 | 3 | 15 | 1.310 | 1830.8 | 0.97 | |
| Example 8 | $Nd_{20}Ho_{10}Dy_{50}Cu_5Co_{15}$ | 10*10*4 | 880 | 20 | 500 | 6 | 3 | 15 | 1.250 | 1775.1 | 0.97 | |
| Comparative Example 3 | $Pr_{30}Gd_5Dy_{40}Cu_{15}Zn_{10}$ | 10*10*4 | 900 | 15 | 450 | 8 | 3 | 20 | 1.370 | 2069.6 | 0.96 | 0.495% |
| Example 9 | $Pr_{30}Gd_5Dy_{40}Cu_{15}Zn_{10}$ | 10*10*4 | 900 | 15 | 450 | 8 | 3 | 20 | 1.345 | 2029.8 | 0.97 | 0.497% |
| Example 10 | $Pr_{30}Gd_5Dy_{40}Cu_{15}Zn_{10}$ | 10*10*4 | 900 | 15 | 450 | 8 | 3 | 20 | 1.341 | 1926.3 | 0.97 | |
| Example 11 | $Pr_{30}Gd_5Dy_{40}Cu_{15}Zn_{10}$ | 10*10*4 | 900 | 15 | 450 | 8 | 3 | 20 | 1.336 | 1814.9 | 0.97 | |
| Example 12 | $Pr_{30}Gd_5Dy_{40}Cu_{15}Zn_{10}$ | 10*10*4 | 900 | 15 | 450 | 8 | 3 | 20 | 1.275 | 1751.2 | 0.97 | |
| Comparative Example 4 | $Pr_{10}Gd_5Dy_{70}Cu_5Ga_{10}$ | 10*10*3 | 910 | 10 | 450 | 8 | 5 | 10 | 1.320 | 2133.3 | 0.96 | 0.485% |
| Example 13 | $Pr_{10}Gd_5Dy_{70}Cu_5Ga_{10}$ | 10*10*3 | 910 | 10 | 450 | 8 | 5 | 10 | 1.295 | 2101.4 | 0.97 | 0.486% |
| Example 14 | $Pr_{10}Gd_5Dy_{70}Cu_5Ga_{10}$ | 10*10*3 | 910 | 10 | 450 | 8 | 5 | 10 | 1.290 | 1990.0 | 0.97 | |
| Example 15 | $Pr_{10}Gd_5Dy_{70}Cu_5Ga_{10}$ | 10*10*3 | 910 | 10 | 450 | 8 | 5 | 10 | 1.284 | 1870.6 | 0.97 | |
| Example 16 | $Pr_{10}Gd_5Dy_{70}Cu_5Ga_{10}$ | 10*10*3 | 910 | 10 | 450 | 8 | 5 | 10 | 1.226 | 1791.0 | 0.97 | |
| Comparative Example 5 | $Pr_{40}Ho_5Dy_{40}Cu_5Ga_5Ti_5$ | 10*10*3 | 910 | 10 | 520 | 4 | 5 | 15 | 1.350 | 2149.2 | 0.97 | 0.495% |

TABLE 3-continued

Diffusion sources, process conditions and characteristics of the sintered NdFeB magnets after diffusion

| | | Size | Diffusion | holding | Aging | holding | Heating rate | Cooling rate | Performance after Diffusion | | | |
|---|---|---|---|---|---|---|---|---|---|---|---|---|
| Number | Diffusion Source | (mm) mm | Temp. ° C. | time h | Temp. ° C. | time h | ° C./ min | ° C./ min | Br | Hcj | Hk/ Hcj | $\beta Hcj_{150° C.}$ |
| Example 17 | $Pr_{40}Ho_5Dy_{40}Cu_5Ga_5Ti_5$ | 10*10*3 | 910 | 10 | 520 | 4 | 5 | 15 | 1.325 | 2109.4 | 0.97 | 0.496% |
| Example 18 | $Pr_{40}Ho_5Dy_{40}Cu_5Ga_5Ti_5$ | 10*10*3 | 910 | 10 | 520 | 4 | 5 | 15 | 1.320 | 1998.0 | 0.97 | |
| Example 19 | $Pr_{40}Ho_5Dy_{40}Cu_5Ga_5Ti_5$ | 10*10*3 | 910 | 10 | 520 | 4 | 5 | 15 | 1.316 | 1830.8 | 0.97 | |
| Example 20 | $Pr_{40}Ho_5Dy_{40}Cu_5Ga_5Ti_5$ | 10*10*3 | 910 | 10 | 520 | 4 | 5 | 15 | 1.260 | 1751.2 | 0.97 | |
| Comparative Example 6 | $Pr_{45}Ho_5Dy_{45}Cu_5Al_3Sn_2$ | 10*10*3 | 910 | 10 | 480 | 3 | 1 | 20 | 1.360 | 2045.7 | 0.96 | 0.505% |
| Example 21 | $Pr_{45}Ho_5Dy_{45}Cu_5Al_3Sn_2$ | 10*10*3 | 910 | 10 | 480 | 3 | 1 | 20 | 1.330 | 2005.9 | 0.97 | 0.509% |
| Example 22 | $Pr_{45}Ho_5Dy_{45}Cu_5Al_3Sn_2$ | 10*10*3 | 910 | 10 | 480 | 3 | 1 | 20 | 1.325 | 1870.6 | 0.97 | |
| Example 23 | $Pr_{45}Ho_5Dy_{45}Cu_5Al_3Sn_2$ | 10*10*3 | 910 | 10 | 480 | 3 | 1 | 20 | 1.320 | 1711.4 | 0.97 | |
| Example 24 | $Pr_{45}Ho_5Dy_{45}Cu_5Al_3Sn_2$ | 10*10*3 | 910 | 10 | 480 | 3 | 1 | 20 | 1.260 | 1655.7 | 0.97 | |
| Comparative Example 7 | $Pr_{35}Gd_{10}Dy_{45}Cu_5Mg_5$ | 10*10*4 | 930 | 6 | 600 | 5 | 1 | 5 | 1.415 | 1862.6 | 0.97 | 0.560% |
| Example 25 | $Pr_{35}Gd_{10}Dy_{45}Cu_5Mg_5$ | 10*10*4 | 930 | 6 | 600 | 5 | 1 | 5 | 1.390 | 1838.8 | 0.97 | 0.565% |
| Example 26 | $Pr_{35}Gd_{10}Dy_{45}Cu_5Mg_5$ | 10*10*4 | 930 | 6 | 600 | 5 | 1 | 5 | 1.365 | 1751.2 | 0.97 | |
| Example 27 | $Pr_{35}Gd_{10}Dy_{45}Cu_5Mg_5$ | 10*10*4 | 930 | 6 | 600 | 5 | 1 | 5 | 1.358 | 1711.4 | 0.97 | |
| Example 28 | $Pr_{35}Gd_{10}Dy_{45}Cu_5Mg_5$ | 10*10*4 | 930 | 6 | 600 | 5 | 1 | 5 | 1.332 | 1631.8 | 0.97 | |

Based on the above data, it is assumed that the CeCu, CeAl, and CeGa powders are added to the grain boundary of the NdFeB alloy flakes and the melting point of the grain boundary is thereby lowered. The obtained modified grain boundary channels of sintered NdFeB permanent magnets are useful for the diffusion process to be followed, especially when the diffusion source is a heavy rare earth alloy. The coercivity of the obtained NdFeB magnets increases significantly to ΔHcj>636.8kA/m after diffusion, and the coercivity of Examples 1-28 is significantly better compared to Comparative Examples 1-7.

Specifically, the various examples and the comparative examples are analyzed as follows:

Examples 1, 2, 3, 4 and Comparative Example 1 have the same size and NdFeB magnet composition except for the Ce content, the same diffusion temperature and aging temperature and other conditions. The performance of Examples 1, 2, 3, 4 and Comparative Example 1 by the diffusion process decreased by 0.022, 0.021, 0.023, 0.02, 0.023T of Br, and increased by 924.2, 891.5, 899.5, 891.5 and 812.7kA/m of ΔHcj. It can be seen that the magnets including Ce show a significant increase of ΔHcj. The difference of Hcj between Example 1 and Comparative Example 1 is only 23.88kA/m. It can further be seen that Example 1 and Comparative Example 1 have basically the same temperature coefficient of the coercivity. That is to say, the βHcj of Comparative Example 1 at temperature of 150° C. is −0.520% and the βHcj of Example 1 at temperature of 150° C. is −0.521%. In summary, the low-cost Ce-containing magnets of the present examples show useful magnetic characteristics.

Examples 5, 6, 7, 8 and the Comparative Example 2 have the same size and NdFeB magnet composition except for the Ce content, the same diffusion temperature and aging temperature and other conditions. The performance of Example 5, 6, 7, 8 and Comparative Example 2 by the diffusion process decreased by 0.025, 0.026, 0.025, 0.023, 0.027T of Br, increased by 915.4, 883.6, 923.4, 899.5 and 804.8kA/m of ΔHcj. The difference in Hcj of Example 5 and Comparative Example 2 are only 39.8kA/m. It can be shown that Example 5 and Comparative Example 2 have basically the same temperature coefficient of the coercivity. That is to say, the βHcj of Comparative Example 2 at temperature of 150° C. is −0.490% and the βHcj of Example 5 at temperature of 150° C. is −0.495%.

Examples 9, 10, 11, 12 and the Comparative Example 3 have the same size and NdFeB magnet composition except for the Ce content, the same diffusion temperature and aging temperature and other conditions. The performance of Examples 9, 10, 11, 12 and Comparative Example 3 by the diffusion process decreased by 0.025, 0.024, 0.024, 0.027, 0.026 T of Br, increased by 887.5, 899.5, 923.4, 899.5 and 784 kA/m of ΔHcj. The difference Hcj of Example 9 and Comparative Example 3 is only 39.8 kA/m. It can be shown that Example 9 and Comparative Example 3 have basically the same temperature coefficient of the coercivity. That is to say, the βHcj of Comparative Example 3 at temperature of 150° C. is −0.495% and the βHcj of Example 9 at temperature of 150° C. is −0.497%.

Examples 13, 14, 15, 16 and the Comparative Example 4 have the same size and NdFeB magnet composition except for the Ce content, the same diffusion temperature and aging temperature and other conditions. The performance of Examples 13, 14, 15, 16 and Comparative Example 4 by the diffusion process decreased by 0.025, 0.027, 0.026, 0.024, 0.025 T of Br, increased by 732.3, 748.2, 756.2, 716.4 and 628.8 kA/m of ΔHcj. The difference Hcj of Example 13 and Comparative Example 4 are only 31.8 kA/m. The βHcj of Comparative Example 4 at temperature of 150° C. is −0.485% and the βHcj of example 13 at temperature of 150° C. is −0.486%.

Examples 17, 18, 19, 20 and the Comparative Example 5 have the same size and NdFeB magnet composition except for the Ce content, the same diffusion temperature and aging temperature and other conditions. The performance of Examples 17, 18, 19, 20 and Comparative Example 5 by the diffusion process decreased by 0.025, 0.025, 0.027, 0.025, 0.027 T of Br, increased by 859.7, 851.7, 835.8, 796 and 754.6 kA/m of ΔHcj. The difference Hcj of Example 17 and Comparative Example 5 is only 38.8 kA/m. It can be shown that Example 17 and Comparative Example 5 have basically the same temperature coefficient of the coercivity. That is to say, the βHcj of Comparative Example 5 at temperature of 150° C. is −0.495% and the βHcj of example 13 at temperature of 150° C. is −0.496%.

Examples 21, 22, 23, 24 and the Comparative Example 6 have the same size and NdFeB magnet composition except for the Ce content, the same diffusion temperature and aging temperature and other conditions. The performance of Examples 21, 22, 23, 24 and Comparative Example 6 by the diffusion process decreased by 0.02, 0.023, 0.023, 0.02, 0.02 T of Br, increased by 796, 772, 756.2, 740.3 and 698 kA/m of ΔHcj. The difference Hcj of Example 21 and Comparative Example 6 is only 38.8 kA/m. It can be shown that Example 21 and Comparative Example 6 have basically the same temperature coefficient of the coercivity. That is to say, the βHcj of Comparative Example 6 at temperature of 150° C. is −0.505% and the Hcj of example 21 at temperature of 150° C. is −0.509%.

Examples 25, 26, 27, 28 and the Comparative Example 7 have the same size and NdFeB magnet composition except for the Ce content, the same diffusion temperature and aging temperature and other conditions. The performance of Examples 26, 27, 28, 29 and Comparative Example 7 by the diffusion process decreased by 0.022, 0.021, 0.02, 0.022, 0.021 T of Br, increased by 761.8, 780, 728.3, 8.87 and 706 kA/m of ΔHcj. The difference Hcj of Example 25 and Comparative Example 7 are only 23.88 kA/m. It can be shown that Example 25 and Comparative Example 7 have basically the same temperature coefficient of the coercivity. That is to say, the βHcj of Comparative Example 7 at temperature of 150° C. is −0.560% and the βHcj of example 25 at temperature of 150° C. is −0.565%.

It has been found that the ΔHcj of Ce-containing magnets after the diffusion process is obviously greater than the ΔHcj of conventional magnets. Ce-containing magnets which are diffused with a heavy rare earth alloy diffusion source are cheaper than the conventional magnets being diffuse by the same heavy rare earth alloy diffusion source. The Ce-containing magnets have obvious cost advantages.

What is claimed is:

1. A method of preparing a sintered RTB based magnet including cerium comprising the following steps:

(S1) providing alloy flakes composed of $R_xT_{(1-x-y-z)}B_yM_z$ wherein

R is at least one of Nd, Pr, Ho, and Gd;

T is at least one of Fe and Co; and

M is at least one of Mg, Ti, Zr, Nb, and Mo; and x, y, and z are 28.0 wt % ≤x≤33.0 wt %, 0.8 wt % ≤ y≤ 1.2 wt %, and 0 wt % ≤z≤3.0 wt %;

(S2) mixing the alloy flakes, a low melting point powder, and a lubricant, then subjecting the mixture to a hydrogen embrittlement process followed in this order by pulverizing the process product to an alloy powder by jet milling, magnetic field orientation molding of the alloy powder to obtain a blank, sintering and aging treatment the blank, and cutting the obtained sintered RTB based magnet into a desired shape, wherein the low melting point powder is at least one of $Ce_\alpha Al_{100-\alpha}$ with 90≤α≤99, $Ce_\beta Cu_{1-\beta}$ with 80 ≤β≤99, and $Ce_\gamma Ga_{1-\gamma}$ with 80≤γ≤99 and wherein a content of the Ce in the mixture is in the range of 1 to 10 wt % based on a total weight of the alloy flakes and the low melting point powder;

(S3) coating a film composed of a diffusion source of formula $R1_xR2_yH_zM_{1-x-y-z}$ on the sintered RTB based magnet, wherein R1 is at least one element of Nd and Pr;

R2 is at least one element of Ho and Gd;

H is at least one element of Tb and Dy;

M is at least two elements of Al, Cu, Ga, Ti, Co, Mg, Zn, and Sn; and x, y, and z are 5.0 wt % <x<50.0 wt %, 0 wt % <y≤ 15.0 wt %, and 30.0 wt % ≤ z<90.0 wt %; and (S4) performing a diffusion heat treatment so as to diffuse the diffusion source into the sintered RTB based magnet, followed by aging the sintered RTB based magnet to obtain the magnet.

2. The method according to claim 1, wherein the hydrogen embrittlement process in step S2 comprises a hydrogen absorption step and a dehydrogenation step, the hydrogen absorption step is performed at a temperature in the range of 100 to 300° C. and the dehydrogenation step is performed at a temperature in the range of 400 to 600° C.

3. The method according to claim 2, wherein during the hydrogen absorption step, the content of hydrogen content is less than 1000 ppm, and the content of oxygen is less than 500 ppm.

4. The method according to claim 1, wherein in step S2, an average particle size D50 of the low melting point powders is 200 nm -4 μm and an average particle size D50 of the RTB based powder after jet milling is 3-5 μm, each measured by laser diffraction.

5. The method according to claim 1, wherein in step S2, a sintering temperature of RTB based magnets is 980-1060° C. and a sintering time is 6-15 h.

6. The method according to claim 1, wherein the aging includes a primary aging step at 850° C. for 3h and a secondary aging step at 450-660° ° C.for 3h.

7. The method according to claim 1, wherein in step S4, a diffusion temperature is 850-930° C. for a diffusion time of 6-30 h and an aging temperature is 420-680° C. for an aging time of 3-10 h.

8. The method according to claim 7, wherein in step S4, a heating rate to the aging temperature is 1-5° C./min and a cooling rate is 5-20° C./min.

9. The method according to claim 2, wherein in step S2, an average particle size D50 of the low melting point powders is 200 nm -4 μm and an average particle size D50 of the RTB based powder after jet milling is 3-5 μm, each measured by laser diffraction.

10. The method according to claim 3, wherein in step S2, an average particle size D50 of the low melting point powders is 200 nm -4 μm and an average particle size D50 of the RTB based powder after jet milling is 3-5 μm, each measured by laser diffraction.

11. The method according to claim 2, wherein in step S2, a sintering temperature of RTB based magnets is 980-1060° C. and a sintering time is 6-15h.

12. The method according to claim 3, wherein in step S2, a sintering temperature of RTB based magnets is 980-1060° C. and a sintering time is 6-15h.

13. The method according to claim 4, wherein in step S2, a sintering temperature of RTB based magnets is 980-1060° C. and a sintering time is 6-15h.

14. The method according to claim 2, wherein the aging includes a primary aging step at 850° C. for 3h and a secondary aging step at 450-660° C. for 3h.

15. The method according to claim 3, wherein the aging includes a primary aging step at 850° C. for 3h and a secondary aging step at 450-660° C. for 3h.

16. The method according to claim 4, wherein the aging includes a primary aging step at 850° C. for 3h and a secondary aging step at 450-660° C. for 3h.

17. The method according to claim 2, wherein in step S4, a diffusion temperature is 850-930° C. for a diffusion time of 6-30 h and an aging temperature is 420-680° C. for an aging time of 3-10 h.

18. The method according to claim 3, wherein in step S4, a diffusion temperature is 850-930° C. for a diffusion time of 6-30 h and an aging temperature is 420-680° C. for an aging time of 3-10 h.

19. The method according to claim 4, wherein in step S4, a diffusion temperature is 850-930° C. for a diffusion time of 6-30 h and an aging temperature is 420-680° C. for an aging time of 3-10 h.

* * * * *